Nov. 18, 1969           K. H. CHANDLER           3,479,058
                    HOSE COUPLING ASSEMBLY
Filed Aug. 12, 1968                          2 Sheets-Sheet 1

INVENTOR.
KENNETH H. CHANDLER
BY
*John H. Widdowson*
ATTORNEY

Nov. 18, 1969  K. H. CHANDLER  3,479,058
HOSE COUPLING ASSEMBLY
Filed Aug. 12, 1968  2 Sheets-Sheet 2
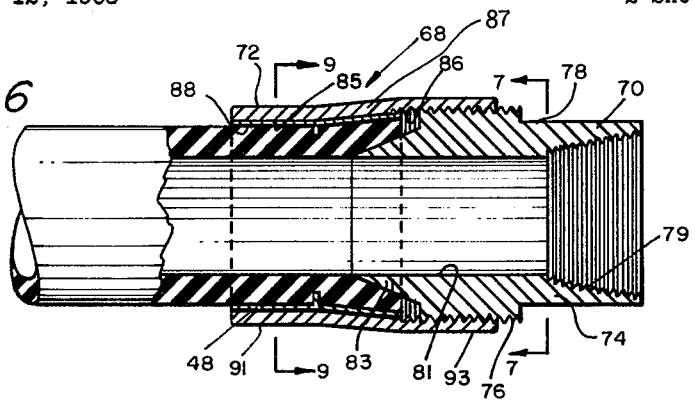
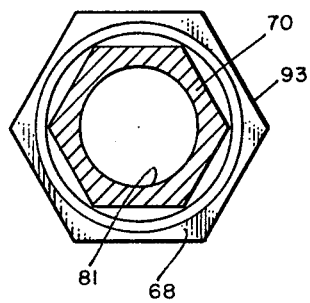
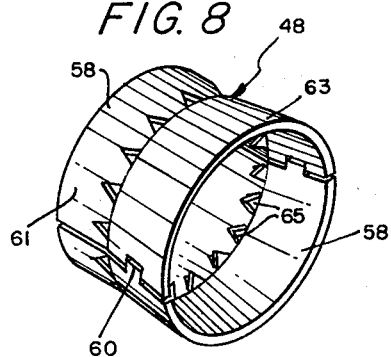
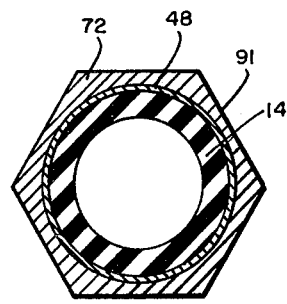
INVENTOR.
KENNETH H. CHANDLER
BY
John H. Widdowson
ATTORNEY United States Patent Office 3,479,058
Patented Nov. 18, 1969

3,479,058
HOSE COUPLING ASSEMBLY
Kenneth H. Chandler, 614 Chase,
Wichita, Kans. 67213
Filed Aug. 12, 1968, Ser. No. 752,051
Int. Cl. F16l 33/22
U.S. Cl. 285—16            3 Claims

ABSTRACT OF THE DISCLOSURE

This invention is a hose coupling assembly providing positive vapor and fluid seal interconnecting a hose member normally transferring volatile fuel. More particularly, this invention is a hose coupling assembly having an attachment nipple adapted to be threaded upon a storage reservoir; a coupling nut mounted about the attachment nipple having internal threads for securing the same to a compression member; and the coupling nut and compression member adapted to receive a hose member therebetween for sealing under compression. Additionally, this invention is a hose coupling assembly readily connected to a hose member and having an anchor and wear sleeve member having inwardly extending teeth member adapted to engage hose member in a secure manner and provide for a compression surface in combination with an attachment nipple.

Numerous types of hose connection devices are known to the prior art adaptable to connect and disconnect hose ends transferring fluid therethrough. However, the prior art devices are generally difficult to attach and detach, expensive in structure through machining required to achieve a positive vapor and fluid seal, and are difficult to use. In the present day hose end connections, there is usually a sleeve or tubular portion that slips into the end of the hose and is secured thereto by a clamp member that surrounds the hose end to securely clamp the hose end to a tubular sleeve therein. However, in this arrangement, the inside diameter of the sleeve is less than the diameter of the hose and therefore amounts to an impedance and reduction in the volume of flow that the hose is capable of handling which slows down the time of transferring the liquid which is undesirable.

In a preferred embodiment of this invention, a hose coupling assembly is provided securable to one end of a hose member and having itself connectible through a threaded means to a storage reservoir, transport truck, or the like. The hose coupling assembly includes an attachment nipple, a coupling nut mountable about the attachment nipple, and a compression member secured to the hose member and connectible to the coupling nut. The attachment nipple is provided with a main body having one end provided with external threads for connection to a storage reservoir and the other end is formed with a flared compression end section. Intermediate of the main body is a hexagonal outer surface adapted to be grasped with a wrench or the like for connect and disconnect purposes. The attachment nipple is provided with a central hole of a size equal in diameter to that of the internal diameter of the hose member. The flared compression end section is provided with a tapered surface extended outwardly from the hole to a shoulder section adapted to receive the coupling nut thereagainst. The coupling nut is provided with a central opening to be placed about the attachment nipple in contact with the shoulder section and provided with an outer surface of hexagonal shape for grasping with a working wrench or tool. The coupling nut is provided with internal threads engagable with mating external threads on the compression member More particularly, the compression member is provided with a main body section having an elongated opening having one end flared outwardly at the area having the external threads. The opposite end is provided with internal threads whereupon the compression member is threadably mounted on the hose member. The hose member extends within the compression member a substantial distance whereupon securing the coupling nut and attachment nipple thereto, the hose member is compressed by the compression end second of the attachment nipple and the mating tapered surface of the compression member to provide a positive seal therebetween.

In another embodiment of this invention, the attachment nipple and coupling nut is used, however, a compression member is provided having only the external threads and with an anchor and wear sleeve member mounted therein in contact with a central bore thereof. The anchor and wear sleeve member is provided with a plurality of inwardly extended notches or teeth members punched out of the sleeve material so as to be engagable with the hose member when mounted thereon. The anchor and wear sleeve is constructed in half sections so as to be easily mountable about the hose member, and when attached to the coupling nut, the attachment nipple forces the hose member outwardly for positive engagement with the teeth members to provide positive anchoring thereto. In one other embodiment of this invention, an attachment coupling is provided havings a main body with a central elongated opening having one end formed with internal threads for attachment to a nipple on a reservoir tank. A mid-portion of the main body is provided with external threads adapted to be engaged with a compression member. The other end of the attachment coupling is tapered inwardly to the outer edge of the opening. The compression member is provided with a main body including an elongated opening having one end formed with internal threads mountable about the attachment coupling. The opening is formed with an inner inclined surface integral with an outer cylindrical surface to be placed about the hose member. One of the anchor and wear sleeve members is mountable within the compression member to secure the hose member thereto. In this embodiment, the entire compression member or the attachment nipple is rotated relative to the other in order to connect the threads for compression of the hose member to provide a fluid seal.

One object of this invention is to provide a hose coupling assembly overcoming the above-mentioned disadvantages of the prior art structures.

Another object of this invention is to provide a hose coupling assembly having an attachment nipple, a coupling nut mounted about the attachment nipple, and a compression member mounted on a hose member releasably engagable with said coupling nut to compress the hose member between the attachment nipple and the compression member.

Still, one other object of this invention is to provide a hose coupling assembly having an anchor and wear sleeve member engagable with and connected to a hose member to compress the same between the sleeve member and an attachment nipple to provide a fume and liquid seal.

One further object of this invention is to provide a hose coupling assembly having an anchor and wear sleeve member whereupon the same can be readily replaced due to wear resulting from the numerous connections and disconnections thereof.

Still, one further object of this invention is to provide an integral hose coupling assembly having an attachment coupling connectible to a compression member to compress a hose member therebetween.

Yet another object of this invention is to provide a hose connection that can be used on hoses of the same inside diameter but which have different wall thicknesses or outside diameter by changing only one member of the fitting such being accomplished by employing different thicknesses of metal for the anchor and wear sleeve member.

One other object of this invention is to provide a hose coupling assembly which is economical to manufacture, simple to connect and disconnect, positive in sealing to prevent volatile fuels from escaping therefrom, provided with a replaceable anchor and wear sleeve member, and without restriction therethrough being of a size equal to or greater than the hose member to which it is connected.

Various other objects, advantages, and features of the inveniton will become apparent to those skilled in the art from the following discussion, taken in conjunction with the accompanying drawings, in which:

FIG. 6 is a side elevational view of a third embodiment of the hose coupling assembly of this invention as secured to a hose member having portions broken away for clarity;

FIG. 7 is a sectional view taken along line 7—7 in FIG. 6;

FIG. 8 is an enlarged perspective view of an anchor and wear sleeve of this invention; and FIG. 9 is a sectional view taken along line 9—9 in FIG. 6.

Figure 1:
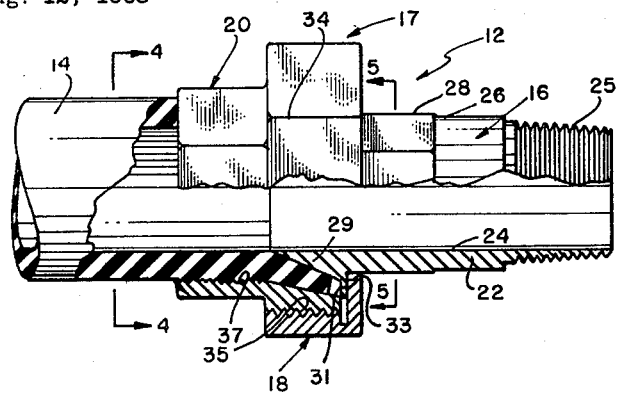
FIG. 1 is a side elevational view of a hose coupling assembly of this invention as secured to a hose member having portions thereof broken away for clarity.
Figure 2:
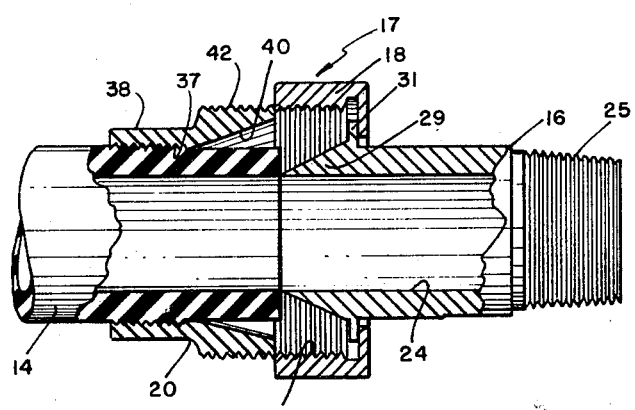
FIG. 2 is a view similar to FIG. 1 showing the hose coupling assembly in the disconnected conditon.
Figure 4:
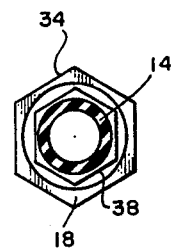
FIG. 4 is a reduced sectional view taken along line 4—4 in FIG. 1.

The following is a discussion and description of preferred specific embodiments of the new hose coupling assembly of this invention, such being made with reference to the drawing, whereupon the same reference numerals are used to indicate the same or similar parts and/or structure. It is to be understood that such discussion and description is not to unduly limit the scope of the invention.

Referring to the drawings in detail and in particular to FIG. 1, a hose coupling assembly, indicated generally as 12, is shown as attached to a hose member 14 which is normally used to convey volatile fluids and preferably constructed of a flexible plastic or rubber material. The hose coupling assembly 12 includes a primary attachment coupling or nipple 16 connectible to a reservoir tank or transport tank; and a compression coupling means 17 including a coupling nut 18 mounted about the attachment nipple 16 and a compression member 20 securable to the hose member 14 and engageable with the coupling nut 18 and cooperating with the attachment nipple 16 to seal with the hose member 14 as will become obvious.

The attachment nipple 16 is provided with an elongated main body 22 having a hole 24 extended axially of a size equal to or larger than the internal diameter of the hose member 14. The main body 22 is provided at one end with external pipe threads 25 and a central portion 26 is provided with a hexagonal shaped outer surface indicated generally at 28 adapted to be grasped by a wrench or similar working tool. The opposite end of the attachment nipple 16 is formed with a fluid compression end section 29 which tapers outwardly from the open end to a shoulder section 31 adapted to be engageable with the coupling nut 18 as will become obvious.

The coupling nut 18 is provided with a central opening 33 of a greater diameter than the attachment nipple 16 and having an outer hexagonal configuration indicated at 34. The coupling nut 18 resembles a cap member and has internal threads 35 engageable with the compression member 20. The central opening 33 of the coupling nut 18 is mounted over the external threads 25 of the attachment nipple 16 into engagement with the shoulder section 31 for moving the attachment nipple 16 inwardly on rotation of the coupling nut 18 as will become obvious.

The compression member 20 is provided with a central threaded opening 37 at a grasping section 38 and having the opening 37 tapered outwardly from a mid-point to the opposite end thereof defining a compression surface 40. The opposite end is provided external threads 42 to be cooperatively mated with the internal threads 35 on the coupling nut 18. The internal threads 37 are to be connected through rotational movement to the hose member 14 with the outer end of the hose member 14 extended substantially to the inner surface of the compression member 20. The outer surface of the hose member 14 adjacent this end contacts the tapered compression surface 40 on assembly as will become obvious.

In the use and operation of the hose coupling assembly 12, it is seen that the attachment nipple 16 is secured to a discharge pipe on a storage reservoir or transport truck and may be operable on opening a gate valve or the like to permit fluid to flow therethrough. The compression member 20 is threadably mounted about the outer surface of the hose member 14 having the outer end of the hose member 14 substantially even with the adjacent end of the compression member 20. The tapered compression end section 29 of the attachment nipple 16 is placed into the internal diameter of the hose member 14 whereupon the same begins to flare outwardly due to the resiliency of the hose member 14. Thereupon, the coupling nut 18 is threadably engaged with the external threads 42 on the compression member 20 and the same is rotated in a conventional right hand manner thereupon. It is obvious that the contacting portion of the coupling nut 18 with the shoulder section 31 on the attachment nipple 16 operates to move to pull the compression member 20 inwardly whereupon the tapered compression end section 29 operates to force the hose member 14 outwardly. On fully threading the coupling nut 18 on the compression member 20, it is obvious that the hose member 14 is thereupon clamped between the inner adjacent surfaces of the attachment nipple 16 and the compression member 20. Additionally, it is noted that the tapered surfaces of the compression member 20 and the attachment nipple 16 are at a different angle relative to respective axes so that on moving the same together, the hose member 14 is positively compressed between the surfaces to provide a fluid seal therewith. It is obvious that the outer hexagonal surfaces of the coupling nut 18 and the compression member 20 permits the compression member 20 to be held stationary while rotating the coupling nut 18 for a quick, efficient connection thereto.

Figure 3:
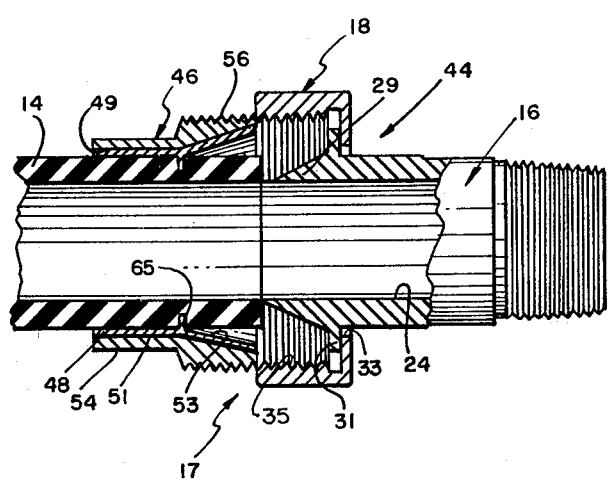
FIG. 3 is another embodiment of the hose coupling assembly of this invention as connected to a hose member and having portions broken away for clarity.
Figure 5:
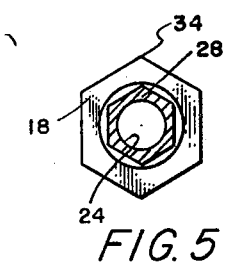
FIG. 5 is a reduced sectional view taken along line 5—5 in FIG. 1.

In another embodiment as shown in FIG. 3, a hose coupling 44 is provided having the attachment nipple 16, the coupling nut 18 mounted about the attachment nipple 16, and a different compression member 46 having an anchor and wear sleeve 48 engageable therewith. The compression member 46 is provided with an elongated opening 49 having a cylindrical section 51 at one end extended to the mid-portion and an outwardly tapered contact surface 53 therefrom. The outer surface of the cylindrical section 51 is formed with a hexagonal surface 54 for grasping with a wrench or the like. The outer surface of the opposite end of the compression member 46 is provided with external threads indicated at 56 cooperatively engageable with the internal threads 35 on the coupling nut 18.

As shown in FIG. 8, the anchor and wear sleeve 48 is comprised of half sections 58 anchored against relative axial movement as by notched key members 60. Each half section 58 is of a semi-circular shape having a generally cylindrical body section 61 and at the mid-portion is provided with an outwardly tapered wear section 63. At the mating of the cylindrical body section 61 and the wear section 63, there is provided about the circumference a plurality of spaced punched out teeth members 65 adapted to engage the hose member 14 as will be explained. The anchor and wear sleeve 48 is provided in half sections so as to be readily mountable about the hose member 14 during assembly and the same can also be easily removed and replaced when required due to wear of this element.

In the use and operation of the hose coupling assembly 44, it is obvious that the attachment nipple 16 is attached to a reservoir tank or transport truck as previously described. First, the compression member 46 is mountable about the connecting end of the hose member 14 whereupon the halves of the anchor and wear sleeves 48 are mountable about the outwardly extended hose member 14 having the outer end thereof substantially aligned. Thereupon, the compression member 46 is slid toward the outer end of the hose member 14 so as to receive the anchor and wear sleeves 48 therein. It is obvious that the teeth members 65 will penetrate the hose member 14 to anchor the same thereto and prevent relative axial movement. The attachment nipple 16 is inserted within the open adjacent end of the hose member 14 whereupon the coupling nut 18 is threaded upon the external threads 56 of the compression member 46 to force the flexible hose member 14 outwardly in contact with the inner tapered surface of the anchor and wear sleeves 48. It is obvious that the same angular relationship relative to the tapered surfaces of the anchor and wear sleeves 48 and that of the flared compression end section 29 of the attachment nipple 16 provides for the positive sealing of the hose member 14 therebetween. On placing the attachment nipple 16 within the hose member 14 and securing the same by the coupling nut 18 for the first time, it is obvious that this also acts to press the hose member 14 outwardly for positive engagement with the teeth members 65 of the anchor and wear sleeve 48.

In one other embodiment of this invention as shown in FIG. 6, a hose coupling assembly 68 is provided including an elongated connector and attachment nipple 70; a compression coupling member 72 mountable about the connector and attachment nipple 70; and one of the anchor and wear sleeve members 48 engagable with the compression coupling member 72. The connector and attachment nipple 70 includes a main body 74 having a central portion provided with external threads 76, an attachment section 78 extended to one end having internal pipe threads 79 integral with an elongated opening 81, and the other end is provided with a tapered compression end section 83. The compression end section 83 is of a slight taper for cooperation with the compression coupling member 72 as will become obvious. The outer surface of the attachment section 78 is of hexagonal shape so as to be easily grasped by a wrench device or the like.

The compression coupling member 72 is provided with an elongated central opening 85 having one end provided with internal threads 86 engageable with the connector and attachment nipple 70; a mid-portion 87 tapered from the threads 86 inwardly toward the opposite end whereupon the same is integral with a generally cylindrical portion 88. The outer surface of the compression coupling member 72 is provided with a hexagonal configuration indicated at both ends at 91 and 93 so that the same may be easily grasped with a wrench.

In the use and operation of the hose coupling assembly 68, it is obvious that the connector and attachment nipple 70 is secured to a transport truck or the like through the use of the internal pipe threads 79 in a conventional manner. The compression coupling member 72 is thereupon mounted about the hose member 14 and slid inwardly from the outer end thereof. Next, the anchor and wear sleeves 48 are placed about the hose member 14 whereupon the compression coupling member 72 is slid outwardly so as to enclose the same and force the teeth members 65 into the hose member 14. (FIG. 6) next, the compression coupling member 72 can be rotated to mate the internal threads 86 with the external threads 76 on the connector and attachment nipple 70 thereby forcing the members together to compress the hose member 14 between the tapered surfaces to provide a positive fluid seal therebetween. The hexagonal configuration of the compression coupling member 72 and the connector and attachment nipple 70 operates to provide an easy means for grasping and rotating these members relative to each other for connecting and disconnecting purposes.

The hose coupling assembly of this invention provides an anchor and wear sleeve element for positive connection to the hose member but allowing the same to be removed and replaced when a hose member has developed a failure and needs to be replaced. The connecting means of my invention provides for a complete 100% seal around the full circumference of the hose. The nipple of the connecting means of my invention does not cut or mar the end of the hose into which it fits upon use.

As will be apparent from the foregoing description of the applicant's hose coupling assembly, relatively inexpensive means have been provided permitting the rapid attachment and detachment of a hose member from a storage reservoir, transport truck, or the like. Additionally, it is obvious that the hose coupling assembly of this invention is simple to use, economical to manufacture, and may be used over and over without expensive replacement parts being required.

While the invention has been described in conjunction with preferred specific embodiments, it will be understood that this description is intended to illustrate and not to limit the scope of the invention.

I claim:

1. A positive seal coupling assembly to connect and disconnect a hose member to a supply source, comprising:
  (a) attachment means connectable to a discharge stem on the supply source;
  (b) compression coupling means secured to said hose member and releasably engagable with said attachment means in a fluid seal relationship, said compression coupling means including a coupling nut threadably engagable with a compression member, said coupling nut operable to move said attachment means relative thereto, and an anchor and wear sleeve member engagable with said hose member, said anchor and wear sleeve in half sections having a first cylindrical portion engagable with said compression member, a second outwardly inclined wear section engageable with an inclined surface on said compression member, a mid-portion with a plurality of inwardly extended teeth members to engage said hose member in a secure manner to prevent relative axial movement therebetween and also provide a wear surface for compressing said hose member between said attachment means and rib and notch means on longitudinal edges on said half sections to align same in position and to prevent relative axial movement therebetween;
  (c) said attachment means having one connector end portion attachable to the supply source and the opposite end portion formed with a flared compression end section having an outer surface converging toward the outer open end relative to the axis thereof;
  (d) said compression coupling means having an elongated opening with one portion thereof having an inner surface inclined divergingly outward from the axis thereof toward a threaded end portion engageable with said coupling nut; and
  (e) said attachment means having an elongated opening therethrough of a diameter at least equal to that of the inside diameter of said hose member for unrestricted flow therethrough and said compression end section inclined greater relative to the axis thereof then said inclined surface of said compression coupling means whereby said hose member is positively clamped therebetween on axial movement of said compression coupling means relative to said attachment means.

2. A coupling assembly as described in claim 1, wherein:
 (a) said attachment means having a main body within one end provided with threads thereon connectible to the discharge stem and the other end provided with an outwardly extending shoulder section to receive said coupling nut thereagainst to move said attachment means axially.

3. A coupling assembly as described in claim 2, wherein:
 (a) said compression coupling means and a mid-portion of said attachment means of hexagonal shape in the outer periphery thereof so as to be readily grasped by a tool member for relative rotation to connect and disconnect said hose member thereto.

References Cited

UNITED STATES PATENTS

| | | | |
|---|---|---|---|
| 533,150 | 1/1895 | Trethewey et al. | 285—246 |
| 1,091,759 | 3/1914 | Paradis | 285—246 |
| 1,098,294 | 5/1914 | Patty | 285—249 |
| 1,361,758 | 12/1920 | Ewald | 285—248 |
| 1,699,591 | 1/1929 | Jennings | 285—246 |
| 2,152,102 | 3/1939 | Stecher | 285—334.5 |
| 2,853,320 | 9/1958 | Liebelt et al. | 285—247 |
| 3,195,936 | 7/1965 | Conder | 285—334.5 |

FOREIGN PATENTS

| | | |
|---|---|---|
| 1,040,123 | 5/1953 | France. |
| 1,096,716 | 2/1955 | France. |
| 624,339 | 6/1949 | Great Britain. |
| 892,194 | 3/1962 | Great Britain. |
| 341,365 | 11/1959 | Switzerland. |

THOMAS F. CALLAGHAN, Primary Examiner

U.S. Cl. X.R.

285—246, 334.5